United States Patent
Danziger

(10) Patent No.: US 10,302,835 B2
(45) Date of Patent: May 28, 2019

(54) LIGHT GUIDE OPTICAL ASSEMBLY

(71) Applicant: LUMUS LTD., Ness Ziona (IL)

(72) Inventor: Yochay Danziger, Kfar Vradim (IL)

(73) Assignee: LUMUS LTD., Ness Ziona (IL)

(*) Notice: Subject to any disclaimer, the term of this patent is extended or adjusted under 35 U.S.C. 154(b) by 0 days.

(21) Appl. No.: 16/004,390

(22) Filed: Jun. 10, 2018

(65) Prior Publication Data

US 2018/0292592 A1     Oct. 11, 2018

Related U.S. Application Data

(63) Continuation of application No. PCT/IL2018/050205, filed on Feb. 22, 2018.
(Continued)

(51) Int. Cl.
*G02B 6/34*     (2006.01)
*F21V 8/00*     (2006.01)
(Continued)

(52) U.S. Cl.
CPC .......... *G02B 6/0016* (2013.01); *G02B 6/00* (2013.01); *G02B 6/0028* (2013.01);
(Continued)

(58) Field of Classification Search
None
See application file for complete search history.

(56) References Cited

U.S. PATENT DOCUMENTS

| 2,748,659 A | 6/1956 | Geffcken et al. |
| 2,795,069 A | 6/1957 | Hardesty |

(Continued)

FOREIGN PATENT DOCUMENTS

| CN | 101542346 | 9/2009 |
| CN | 107238928 | 10/2017 |

(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

*Primary Examiner* — Tina M Wong
(74) *Attorney, Agent, or Firm* — Mark M. Friedman

(57) ABSTRACT

An optical assembly for optical aperture expansion combines facet reflective technology with diffractive technology. At least two diffractive components having opposite optical power (matching) are used, so that chromatic dispersion introduced by the first diffractive component will then be cancelled by the second diffractive component. The two diffractive components are used in combination with a reflective optical component to achieve more efficient aperture expansion (for near eye display), reducing distortions and noise, while also reducing design constraints on the system and individual components, as compared to conventional techniques. The assembly eliminates and/or reduces the need for polarization management, while enabling wider field of view. In addition, embodiments can have reduced nonuniformity, as compared to conventional single technology implementations, since the distortion patterns of the two technologies do not correlate.

8 Claims, 10 Drawing Sheets

SIDE VIEW

FRONT VIEW

Related U.S. Application Data

(60) Provisional application No. 62/461,805, filed on Feb. 22, 2017.

(51) Int. Cl.
   *G02B 27/01* (2006.01)
   *G02B 6/00* (2006.01)
   *G02B 27/10* (2006.01)
   *G02B 27/28* (2006.01)

(52) U.S. Cl.
   CPC .......... *G02B 6/0038* (2013.01); *G02B 6/0075* (2013.01); *G02B 6/34* (2013.01); *G02B 27/0172* (2013.01); *G02B 27/10* (2013.01); *G02B 27/28* (2013.01); *G02B 2027/0116* (2013.01); *G02B 2027/0125* (2013.01)

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Maechler |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 * | 12/2004 | Amitai ................ G02B 6/0018 359/629 |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,457,040 B2 | 11/2008 | Amitai |
| 7,577,326 B2 | 8/2009 | Amitai |
| 7,643,214 B2 | 1/2010 | Amitai |
| 7,672,055 B2 | 3/2010 | Amitai |
| 7,724,441 B2 | 5/2010 | Amitai |
| 7,724,443 B2 | 5/2010 | Amitai |
| 7,751,122 B2 | 7/2010 | Amitai |
| 7,764,413 B2 * | 7/2010 | Levola ............... G02B 27/4205 359/13 |
| 7,778,508 B2 | 8/2010 | Hirayama |
| 7,949,214 B2 | 5/2011 | Dejong |
| 7,995,275 B2 | 8/2011 | Maeda et al. |
| 8,000,020 B2 | 8/2011 | Amitai |
| 8,004,765 B2 | 8/2011 | Amitai |
| 8,035,872 B2 | 10/2011 | Ouchi |
| 8,098,439 B2 | 1/2012 | Amitai et al. |
| 8,369,019 B2 | 2/2013 | Baker |
| 8,405,573 B2 | 3/2013 | Lapidot et al. |
| 8,432,614 B2 | 4/2013 | Amitai |
| 8,643,948 B2 | 2/2014 | Amitai et al. |
| 8,665,178 B1 | 3/2014 | Wang |
| 8,666,208 B1 | 3/2014 | Amirparviz et al. |
| 8,736,963 B2 | 5/2014 | Robbins et al. |
| 8,743,464 B1 | 6/2014 | Amirparviz |
| 8,848,289 B2 * | 9/2014 | Amirparviz ........ G02B 27/0172 359/485.05 |
| 8,913,865 B1 | 12/2014 | Bennett |
| 8,965,152 B2 | 2/2015 | Simmonds |
| 9,025,253 B2 | 5/2015 | Hadad et al. |
| 9,248,616 B2 | 2/2016 | Amitai |
| 9,274,338 B2 * | 3/2016 | Robbins ............... G02B 27/017 |
| 9,551,880 B2 | 1/2017 | Amitai |
| 9,568,738 B2 | 2/2017 | Mansharof et al. |
| 9,804,396 B2 | 10/2017 | Amitai |
| 9,805,633 B2 | 10/2017 | Zheng |
| 9,915,823 B1 * | 3/2018 | Kress ................. G02B 27/0172 |
| 9,933,684 B2 * | 4/2018 | Brown ...................... G02F 1/29 |
| 10,048,499 B2 | 8/2018 | Amitai |
| 10,133,070 B2 * | 11/2018 | Danziger ................ G02F 1/295 |
| 2001/0030860 A1 | 10/2001 | Kimura et al. |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |

(56) References Cited

U.S. PATENT DOCUMENTS

| | | |
|---|---|---|
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1* | 11/2004 | Nakanishi ............ G02B 5/1809 359/572 |
| 2005/0018308 A1 | 1/2005 | Cassarly et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1* | 6/2006 | Levola ............... G02B 27/0081 359/569 |
| 2006/0132914 A1 | 6/2006 | Weiss et al. |
| 2007/0070859 A1 | 3/2007 | Nippon |
| 2007/0188837 A1 | 8/2007 | Shimizu et al. |
| 2008/0094586 A1 | 4/2008 | Hirayama |
| 2008/0151379 A1 | 6/2008 | Amitai |
| 2008/0198471 A1 | 8/2008 | Amitai |
| 2008/0278812 A1 | 11/2008 | Amitai |
| 2009/0122414 A1 | 5/2009 | Amitai |
| 2009/0190222 A1 | 7/2009 | Simmonds et al. |
| 2010/0067110 A1 | 3/2010 | Amitai et al. |
| 2010/0111472 A1 | 5/2010 | DeJong |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0306940 A1 | 12/2012 | Machida |
| 2013/0022316 A1 | 1/2013 | Pelletier et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0219834 A1 | 8/2015 | Nichol et al. |
| 2015/0241619 A1 | 8/2015 | Richards et al. |
| 2016/0116743 A1 | 4/2016 | Amitai |
| 2016/0170214 A1 | 6/2016 | Amitai |
| 2016/0234485 A1 | 8/2016 | Robbins et al. |
| 2016/0238772 A1* | 8/2016 | Waldern .................. G02B 5/32 |
| 2016/0238844 A1 | 8/2016 | Dobschal |
| 2016/0341964 A1 | 11/2016 | Amitai |
| 2016/0370693 A1 | 12/2016 | Watanabe |
| 2017/0045743 A1 | 2/2017 | Dobschal et al. |
| 2017/0075119 A1 | 3/2017 | Schultz et al. |
| 2017/0242249 A1 | 8/2017 | Wall |
| 2017/0343822 A1 | 11/2017 | Border et al. |

FOREIGN PATENT DOCUMENTS

| | | |
|---|---|---|
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 1748305 | 1/2007 |
| EP | 0770818 | 4/2007 |
| EP | 1779159 | 5/2007 |
| EP | 2530510 | 12/2012 |
| EP | 3347761 | 7/2018 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | H1994242260 | 3/1996 |
| JP | 2002539498 | 11/2002 |
| JP | 2003536102 | 12/2003 |
| JP | 2004527801 | 9/2004 |
| JP | 2005084522 | 3/2005 |
| JP | 2006003872 | 1/2006 |
| JP | 2009515225 | 4/2009 |
| JP | 2010060770 | 3/2010 |
| JP | 2010170606 | 8/2010 |
| JP | 2013076847 | 4/2013 |
| TW | 201809768 | 3/2018 |
| TW | 201809798 | 3/2018 |
| WO | 9510106 | 4/1995 |
| WO | 9815868 | 4/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 0195027 | 12/2001 |
| WO | 02082168 | 10/2002 |
| WO | 03058320 | 7/2003 |
| WO | 03081320 | 10/2003 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006085308 | 8/2006 |
| WO | 2006085309 | 8/2006 |
| WO | 2006085310 | 8/2006 |
| WO | 2006087709 | 8/2006 |
| WO | 2006098097 | 9/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009009268 | 1/2009 |
| WO | 2009074638 | 6/2009 |
| WO | 2011130720 | 10/2011 |
| WO | 2013065656 | 5/2013 |
| WO | 2013175465 | 11/2013 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |

* cited by examiner

Fig.1. (Prior Art)
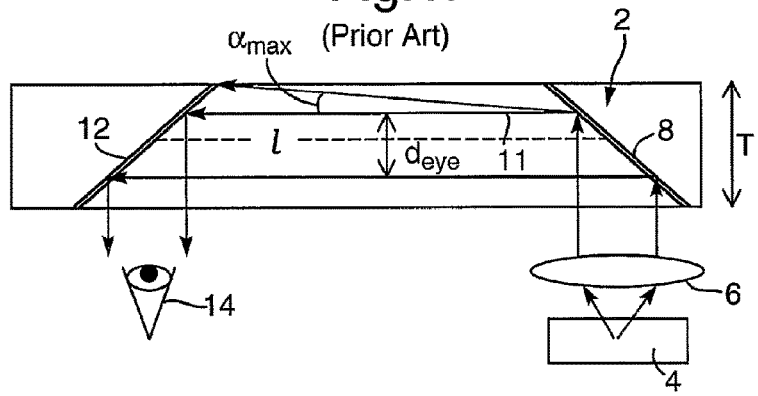
PRIOR ART Fig.2.
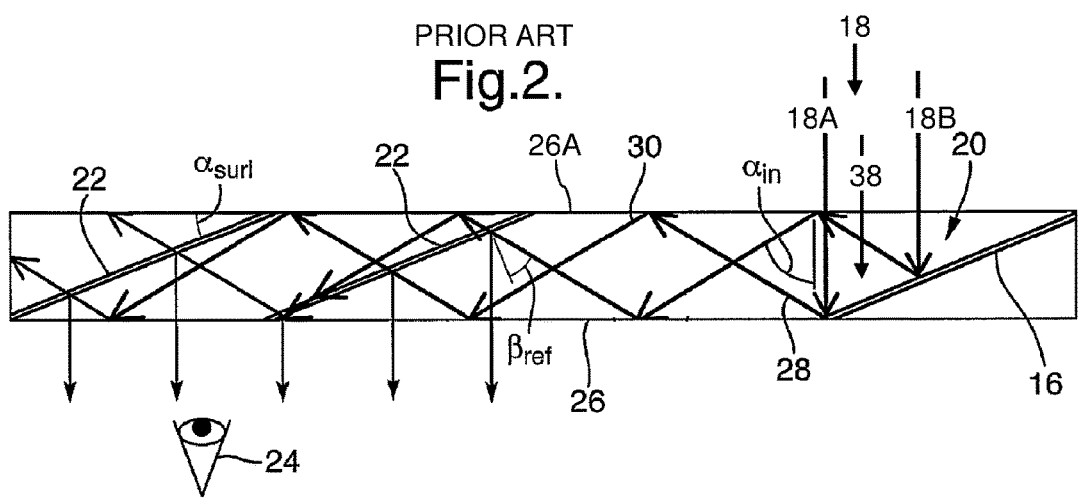
PRIOR ART Fig.3A.      PRIOR ART Fig.3B.
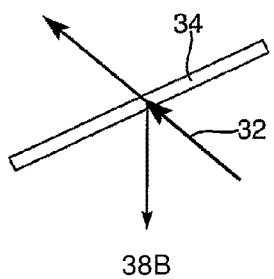

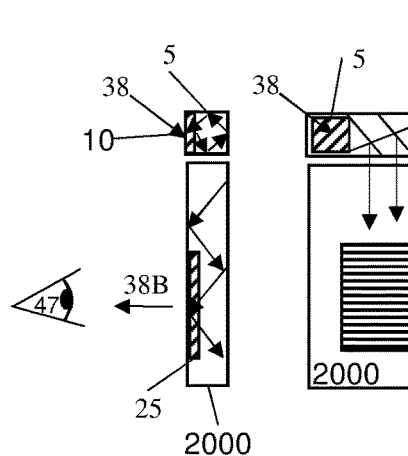
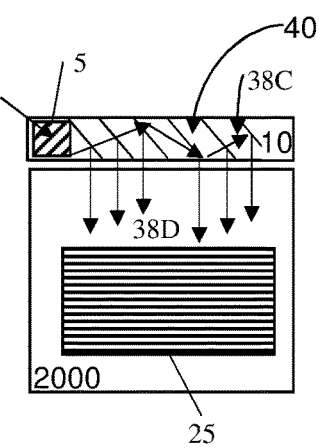
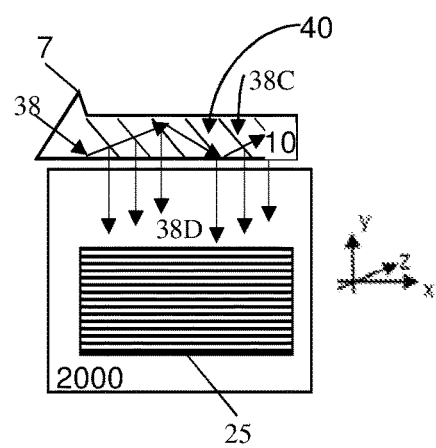
FIG. 8A  FIG. 8B  FIG. 8C
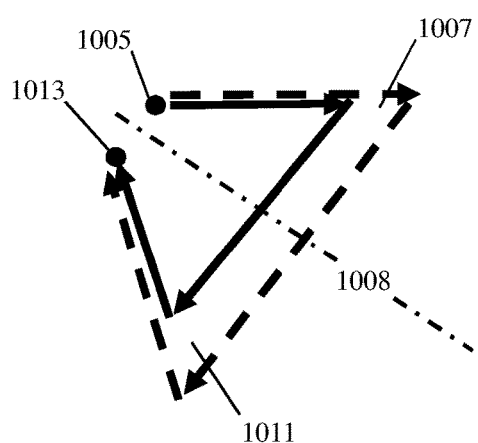
FIG. 8D

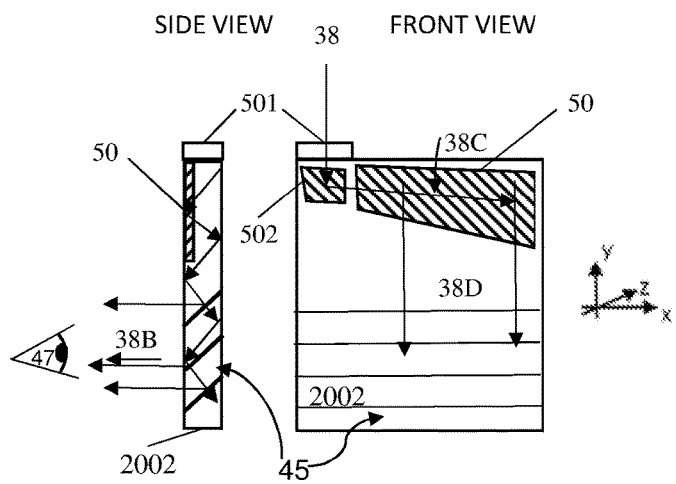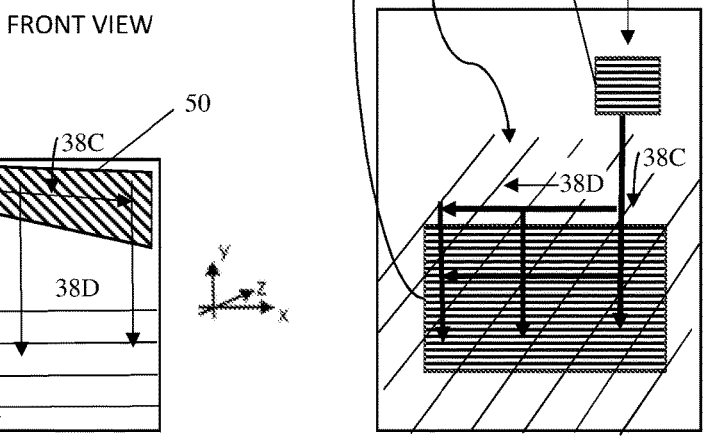
FIG. 11A  FIG. 11B  FIG. 11C
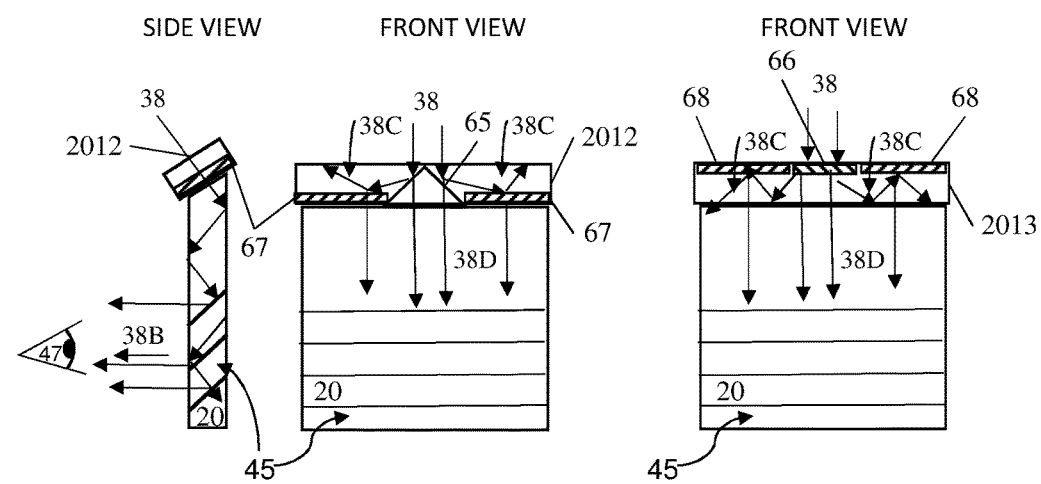
FIG. 12A  FIG. 12B  FIG. 12C

LIGHT GUIDE OPTICAL ASSEMBLY

FIELD OF THE INVENTION

The present invention generally relates to optical assemblies, and in particular, it concerns optical aperture expansion.

BACKGROUND OF THE INVENTION—FIG. 7A TO FIG. 7B

Referring to FIG. 7A, there is shown a rough sketch of conventional optical aperture expansion using diffractive components in a waveguide. In the current figure, incoming light (image) is vertical from outside the page into the page. Coupling-in element 1001 couples the incoming light into lateral expansion element 1002, which expands the light laterally (from left to right in the current figure). Then the laterally expanded light is coupled into vertical expansion element 1003 which expands the light vertically (from top to bottom in the current figure), and couples-out the light to a user (eye of a viewer).

Conventional diffractive elements introduce chromatic dispersion where light-rays with different wavelengths diffract at different angles. To reduce chromatic dispersion narrowband light sources (such as lasers) can be used. A more practical solution is to design the diffractive components to cancel the dispersion of each other.

Referring to FIG. 7B, there is shown a diagram of the FIG. 7A diffraction directions of light propagating in the angular domain (angular space). Dashed arrows and solid arrows show two different exemplary wavelengths. The starting angle at area 1005 represents the angle of the light rays as the light rays impinge on the first diffractive element (coupling-in element 1001) to be coupled into the lightguide. Area 1007 represents the direction of the light rays after coupling in element 1001, Area 1009 after lateral expansion element 1002, and the area 1005 also represents the angle of the light rays after coupling out of the lightguide by vertical expansion element 1003. The direction of the light rays entering the lightguide is equal to the direction of the light rays coupled out of the lightguide in order to minimize chromatic dispersion. It is apparent that different wavelengths will have different directions as the different wavelengths of light propagate within the lightguide, and will have the same direction when output from the lightguide.

BASIC TECHNOLOGY—FIGS. 1 TO 6

FIG. 1 illustrates a conventional prior art folding optics arrangement, wherein the substrate 2 is illuminated by a display source 4. The display is collimated by a collimating optics 6, e.g., a lens. The light from the display source 4 is coupled into substrate 2 by a first reflecting surface 8, in such a way that the main ray 11 is parallel to the substrate plane. A second reflecting surface 12 couples the light out of the substrate and into the eye of a viewer 14. Despite the compactness of this configuration, this configuration suffers significant drawbacks. In particular, only a very limited FOV can be achieved.

Referring now to FIG. 2 there is shown a side view of an exemplary light-guide optical element (LOE). To alleviate the above limitations, an array of selectively reflecting surfaces can be used, fabricated within a light-guide optical element (LOE). The first reflecting surface 16 is illuminated by a collimated display light ray (beams) 18 emanating from a light source (not shown) located behind the device. For simplicity in the current figures, only one light ray is generally depicted, the incoming light ray 38 (also referred to as the "beam" or the "incoming ray"). Other rays of incoming light, such as beams 18A and 18B may be used to designate edges of the incident pupil, such as a left and right edge of an incoming light pupil. Generally, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image.

The reflecting surface 16 reflects the incident light from the source such that the light is trapped inside a lightguide 20 by total internal reflection. The lightguide 20 is also referred to as a "waveguide", "planar substrate" and a "light-transmitting substrate." The lightguide 20 includes at least two (major) surfaces parallel to each other, shown in the current figure as a back (major) surface 26 and a front (major) surface 26A. Note that the designation of "front" and "back" with regard to the major surfaces (26, 26A) is for convenience of reference, as the lightguide 20 is normally symmetric (so references to the major surfaces 26, 26A can be switched, with the same result). Lightguide 20 is referred to in the context of this document as a one-dimensional (1D) waveguide, guiding the injected image in only one dimension between one pair of parallel faces (in this case, the major surfaces 26, 26A).

Incoming light ray 38 enters the substrate at a proximal end of the substrate (right side of the figure). Light propagates through the lightguide and one or more facets, normally at least a plurality of facets, and typically several facets, toward a distal end of the lightguide (left side of the figure). Light propagates through the lightguide in both an initial direction 28 of propagation, and another direction 30 of propagation.

After several reflections off the surfaces of the substrate 20, the trapped waves reach an array of selectively reflecting surfaces 22, which couple the light out of the substrate into the eye 24 of a viewer. In alternative configurations, the selectively reflecting surfaces 22 are immediately after light ray 18 enters the substrate, without first reflecting off the surfaces of the substrate 20.

Internal, partially reflecting surfaces, such as selectively reflecting surfaces 22 are generally referred to in the context of this document as "facets." In the limit, facets can also be entirely reflecting (100% reflectivity, or a mirror, for example the last facet at the distal end of a substrate), or minimal-reflecting. For augmented reality applications, the facets are partially reflecting, allowing light from the real world to enter via upper surface 26A, traverse the substrate including facets, and exit the substrate via lower surface 26 to the eye 24 of the viewer. For virtual reality applications, the facets may have alternative reflectivities0, such as the first coupling in mirror having 100% reflectivity, as the image light from the real world does not have to traverse this mirror. The internal partially reflecting surfaces 22 generally at least partially traverse the lightguide 20 at an oblique angle (i.e., neither parallel nor perpendicular) to the direction of elongation of the lightguide 20.

References to reflectivity are generally with respect to the nominal reflectivity. The nominal reflectivity being the total reflection needed at a specific location in the substrate. For example, if the reflectivity of a facet is referred to as 50%, generally this refers to 50% of the nominal reflectivity. In a case where the nominal reflectivity is 10%, then 50% reflectivity results in the reflectivity of the facet being 5%. One skilled in the art will understand the use of percentages of reflectivity from context of use. Partial reflection can be implemented by a variety of techniques, including, but not limited to transmission of a percentage of light, or use of polarization.

FIGS. 3A and 3B illustrate a desired reflectance behavior of selectively reflecting surfaces. In FIG. 3A, the ray 32 is partially reflected from facet 34 and coupled out 38B of the substrate 20. In FIG. 3B, the ray 36 is transmitted through the facet 34 without any notable reflection.

FIG. 4A is a detailed sectional view of an array of selectively reflective surfaces that couple light into a substrate, and then out into the eye of a viewer. As can be seen, a ray 38 from the light source 4 impinges on the first partially reflective surface. Part of the ray 41 continues with the original direction and is coupled out of the substrate. The other part of the ray 42 is coupled into the substrate by total internal reflection. The trapped ray is gradually coupled out from the substrate by the other two partially reflecting surfaces 22 at the points 44. The coating characteristics of the first reflecting surface 16 should not necessarily be similar to that of the other reflecting surfaces 22, 46. This coating can be a simpler beam-splitter, either metallic, dichroic or hybrid metallic-dichroic. Similarly, in a case of a non-see-through system, the last reflecting surface 46 can be a simple mirror.

FIG. 4B is a detailed sectional view of an apparatus including an array of reflective surfaces wherein the last surface 46 is a total reflecting mirror. The extreme left part of the last reflecting surface 46 cannot be optically active in such a case, and the marginal rays 48 cannot be coupled out from the substrate. Hence, the output aperture of the device will be slightly smaller. However, the optical efficiency can be much higher and fabrication process of the LOE can be much simpler.

It is important to note that, unlike the configuration illustrated in FIG. 2, there is a constraint on the orientation of the reflective surfaces 16 and 22. In the former configuration all the light is coupled inside the substrate by the reflective surface 16. Hence, surface 16 need not be parallel to surfaces 22. Moreover, the reflecting surfaces might be oriented such that the light will be coupled out from the substrate in the opposite direction to that of the input waves. For the configuration illustrated in FIG. 4A, however, part of the input light is not reflected by surface 16, but continues in an original direction of the input light 38 and is immediately coupled-out from the substrate as output light 41. Hence, to ensure that all the rays originating from the same plane wave will have the same output direction, not only should all the reflecting surfaces 22 be parallel to each other, but surface 16 should be parallel to surfaces 22 as well.

Refer again to FIG. 4A there is shown a system having two reflective surfaces for coupling the light out of the substrate, however, any number of reflective surfaces can be used according to the required output aperture of the optical system and the thickness of the substrate. Naturally, there are cases where only one coupling-out surface is required. In that case, the output aperture will essentially be twice the size of the input aperture of the system. The only required reflecting surfaces for the last configuration are simple beam-splitters and mirrors.

In the apparatus described in the current figure, the light from the display source is coupled into the substrate at the end of the substrate, however, there are systems where having a symmetric system is preferred. That is, the input light should be coupled into the substrate at the central part of the substrate.

FIG. 4C is a diagram illustrating detailed sectional views of a transverse pupil expansion one-dimensional (1D) light-guide having a symmetrical structure. The current figure illustrates a method to combine two identical substrates, to produce a symmetric optical module. As can be seen, part of the light from the display source 4 passes directly through the partially reflecting surfaces out of the substrate. The other parts of the light are coupled into the right side of the substrate 20R and into the left side of the substrate 20L, by the partially reflecting surfaces 16R and 16L, respectively. The trapped light is then gradually coupled out by the reflecting surfaces 22R and 22L, respectively. Apparently, the output aperture is three times the size of the input aperture of the system, the same magnification as described in FIG. 5B. However, unlike the system there, the system here is symmetric about the cemented surface 29 of the right and left substrates.

Referring now to FIG. 5A and FIG. 5B, there is shown exemplary implementations of FIG. 4B and FIG. 4C on top of a lightguide. The configurations of FIG. 4B and FIG. 4C expand the incoming image laterally. The apparatus of FIG. 4B can be used to implement the first LOE 20a of FIG. 5A, the apparatus of FIG. 4C can be used to implement the first LOE 20a' of FIG. 5B, and the apparatus of FIG. 2 can be used to implement the second LOE 20b.

FIG. 5A illustrates an alternative method to expand the beam along two axes utilizing a double LOE configuration. The input wave 90 is coupled into the first LOE 20a, which has an asymmetrical structure similar to that illustrated in FIG. 4B, by the first reflecting surface 16 a and then propagates along the η axis. The partially reflecting surfaces 22a couple the light out of first LOE 20a and then the light is coupled into the second asymmetrical LOE 20b by the reflecting surface 16b. The light then propagates along the ξ axis and is then coupled out by the selectively reflecting surfaces 22b. As shown, the original beam 90 is expanded along both axes, where the overall expansion is determined by the ratio between the lateral dimensions of the elements 16a and 22b. The configuration given in FIG. 5A is just an example of a double-LOE setup. Other configurations in which two or more LOEs are combined together to form complicated optical systems are also possible.

Referring now to FIG. 5B, there is shown a diagram illustrating another method to expand a beam along two axes utilizing a double LOE configuration. Usually, the area where the light is coupled into the second LOE 20b by the surface 16b cannot be transparent to the external light and is not part of the see-through region. Hence, the first LOE 20a need not be transparent. As a result, it is usually possible to design the first LOE 20a to have a symmetric structure, as can be seen in the current figure, even for see-through systems. The second LOE 20b has an asymmetrical structure that enables the user to see the external scene. In this configuration, part of the input beam 90 continues along the original direction 92 into the coupling-in mirror 16b of the second LOE 20b, while the other part 94 is coupled into the first LOE 20a' by the reflecting surfaces 16a, propagates along the η axis and is then coupled into the second LOE 20b by the selectively reflecting surfaces 22a. Both parts are then coupled into the second asymmetrical LOE 20b by the reflecting surface 16b, propagate along the axis, and are then coupled out by the selectively reflecting surfaces 22b.

FIG. 6 illustrates an example of LOEs 20a/20a' and 20b embedded in a standard eyeglasses frame 107. The display source 4, and the folding and the collimating optics 6 are assembled inside the arm portions 112 of the eyeglasses frame, just next to LOE 20a/20a', which is located at the edge of the second LOE 20b. For a case in which the display source is an electronic element, such as a small CRT, LCD, or OLED, the driving electronics 114 for the display source might be assembled inside the back portion of the arm 112. A power supply and data interface 116 is connectable to arm 112 by a lead 118 or other communication means including radio or optical transmission. Alternatively, a battery and miniature data link electronics can be integrated in the eyeglasses frame. The current figure is an example, and other possible head-mounted displays arrangements can be constructed, including assemblies where the display source is mounted parallel to the LOE plane, or in the upper part of the LOE.

Additional details of this basic technology can be found in U.S. Pat. No. 7,643,214, and PCT/IL2018/050025 which is unpublished and does not constitute prior art to the present invention.

SUMMARY

According to the teachings of the present embodiment there is provided a apparatus for optical aperture expansion including: at least one lightguide; a set of three optical components associated with the at least one lightguide, the set including: a pair of first and second matching diffractive optical components; and a reflective optical component including a sequence of a plurality of partially reflective, mutually parallel surfaces; and the components cooperating for expanding coupled-in light to coupled-out light, the coupled-in light being light coupled into the at least one lightguide, and the expanding being two-dimensional.

In an optional embodiment, a first optical component of the set is configured for directing the coupled-in light in a first direction of expansion within a first lightguide, thereby generating first expanded light; a second optical component of the set is configured for coupling the first expanded light into a second lightguide in a second direction of expansion, thereby generating second expanded light; and a third optical component of the set configured for out-coupling the second expanded light in a third direction as the coupled-out light; wherein the first, second and third directions are non-parallel to each other.

In another optional embodiment further including: a non-diffractive optical component configured to direct light into the at least one lightguide as the coupled-in light; wherein the at least one lightguide is one lightguide including: the first diffractive optical component configured for directing the coupled-in light in a first direction of expansion within the one lightguide, thereby generating first expanded light; the second diffractive optical component configured for expanding the first expanded light in the one lightguide in a second direction of expansion, thereby generating second expanded light; and the reflective optical component configured for out-coupling the second expanded light in a third direction as the coupled-out light; wherein the first, second and third directions are non-parallel to each other.

In another optional embodiment, further including a pair of third and fourth matching diffractive optical components; and a pair of fifth and sixth matching diffractive optical components.

In another optional embodiment, each of the optical components of the matching pairs has a different diffractive spacing from the optical components of other matching pairs, the diffractive spacing such that each of the optical components of the matching pairs deflects a different wavelength through similar angles from the optical components of other matching pairs.

In another optional embodiment, the wavelengths are of red, green, and blue light.

In another optional embodiment, a first lightguide of the at least one lightguide includes the pair of first and second matching diffractive optical components; a second lightguide of the at least one lightguide includes the pair of third and fourth matching diffractive optical components; and a third lightguide of the at least one lightguide includes the pair of fifth and sixth matching diffractive optical components.

In another optional embodiment, the reflective optical component is configured to expand the coupled-in light in a first direction of expansion within a first lightguide, thereby generating first expanded light; the first, third, and fourth diffractive optical components are configured for expanding respective wavelengths of the first expanded light in respective first, second, and third lightguides in a second direction of expansion, thereby generating respective second expanded light; and the second, fourth, and sixth diffractive optical components are configured for out-coupling the respective second expanded light in a third direction as the coupled-out light; wherein the first, second and third directions are non-parallel to each other.

BRIEF DESCRIPTION OF FIGURES

The embodiment is herein described, by way of example only, with reference to the accompanying drawings, wherein:

FIG. 1 is a side view of a prior art folding optical device.

FIG. 2 is a side view of an exemplary light-guide optical element.

FIGS. 3A and 3B illustrate the desired reflectance and transmittance characteristics of selectively reflecting surfaces, for two ranges of incident angles.

FIG. 8A and FIG. 8B are respective side and front view rough sketches of a diffractive-reflective-diffractive exemplary embodiment.

FIG. 8C is a rough sketch of a reflective-diffract exemplary embodiment.

FIG. 8D is a diagram of the FIG. 8A and FIG. 8B diffraction directions of light propagating in the angular domain.

FIG. 11A and FIG. 11B are respective side and front view rough sketches of a diffractive-diffractive-reflective exemplary embodiment.

FIG. 11C is a front view rough sketch of overlapping diffractive-reflective-diffractive exemplary embodiment.

FIG. 12A and FIG. 12B are respective side and front views of a rough sketch of a diffractive-reflective exemplary embodiment.

FIG. 12C is a front view of a rough sketch of a diffractive-diffractive-reflective exemplary embodiment.

ABBREVIATIONS AND DEFINITIONS

Figure 4A:
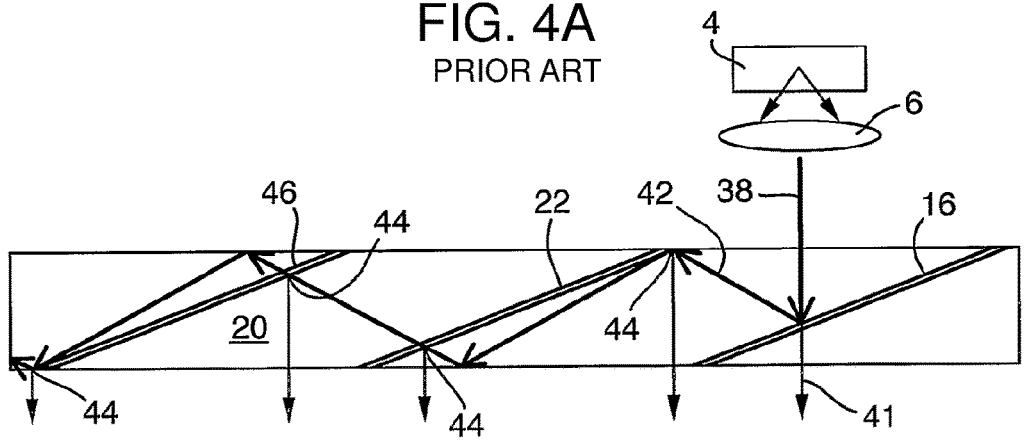
FIG. 4A is a diagram illustrating an exemplary configuration of a light-guide optical element.
Figure 4B:
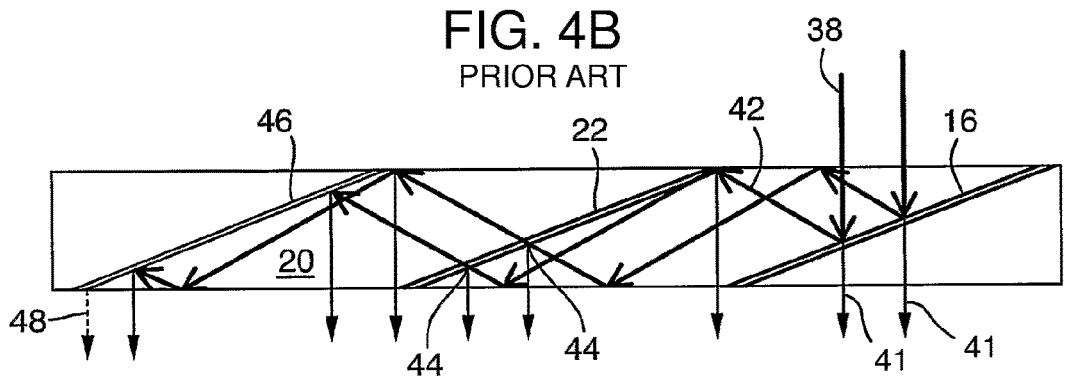
FIG. 4B is a diagram illustrating another configuration of a light-guide optical element.
Figure 4C:
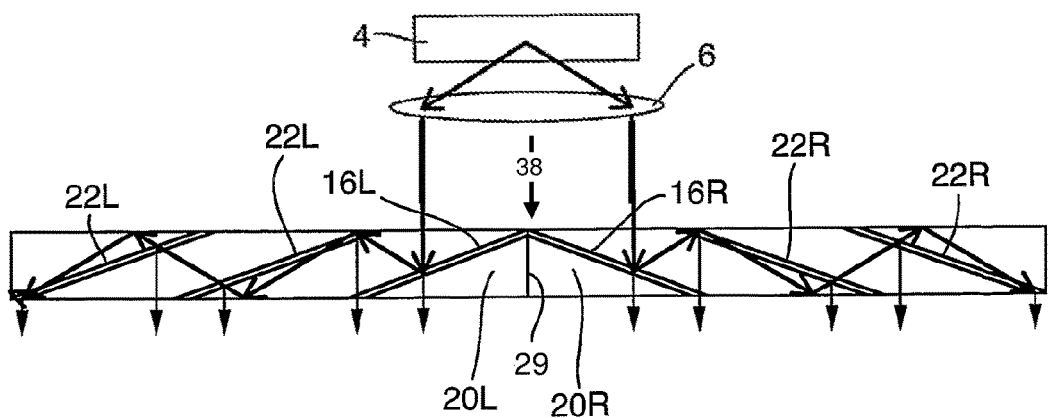
FIG. 4C is a diagram illustrating detailed sectional views of a transverse pupil expansion one-dimensional lightguide having a symmetrical structure.
Figure 5A:
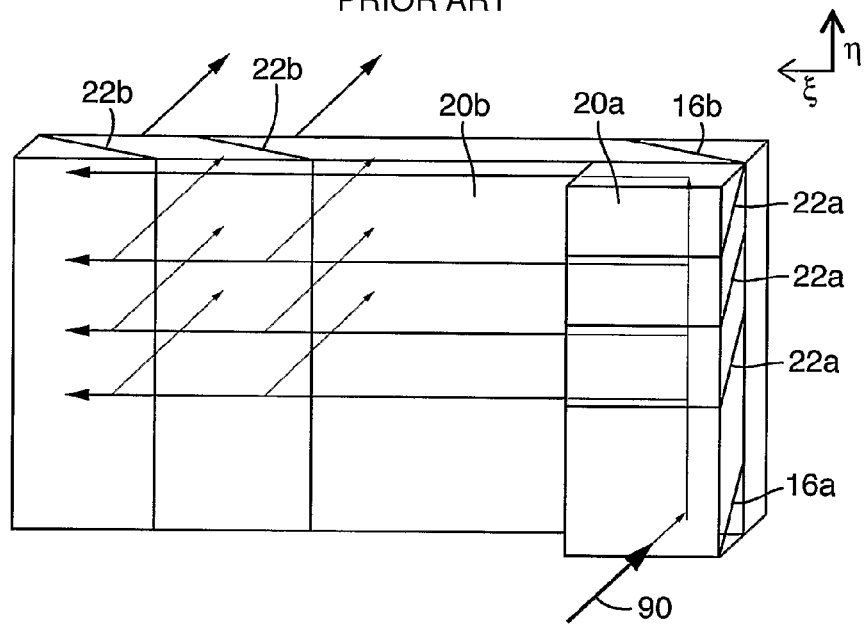
FIG. 5A is a diagram illustrating a method to expand a beam along two axes utilizing a double LOE configuration.
Figure 5B:
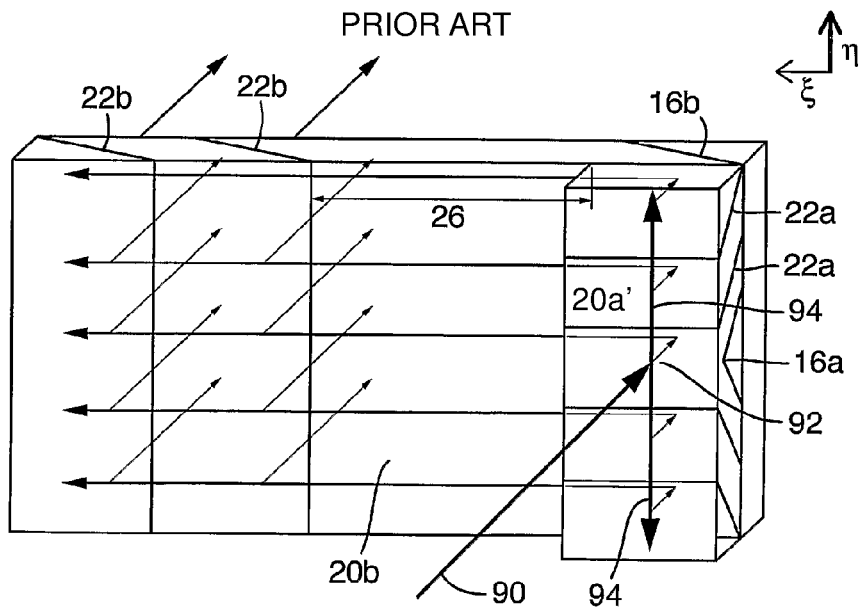
FIG. 5B is a diagram illustrating another method to expand a beam along two axes utilizing a double LOE configuration.
Figure 6:
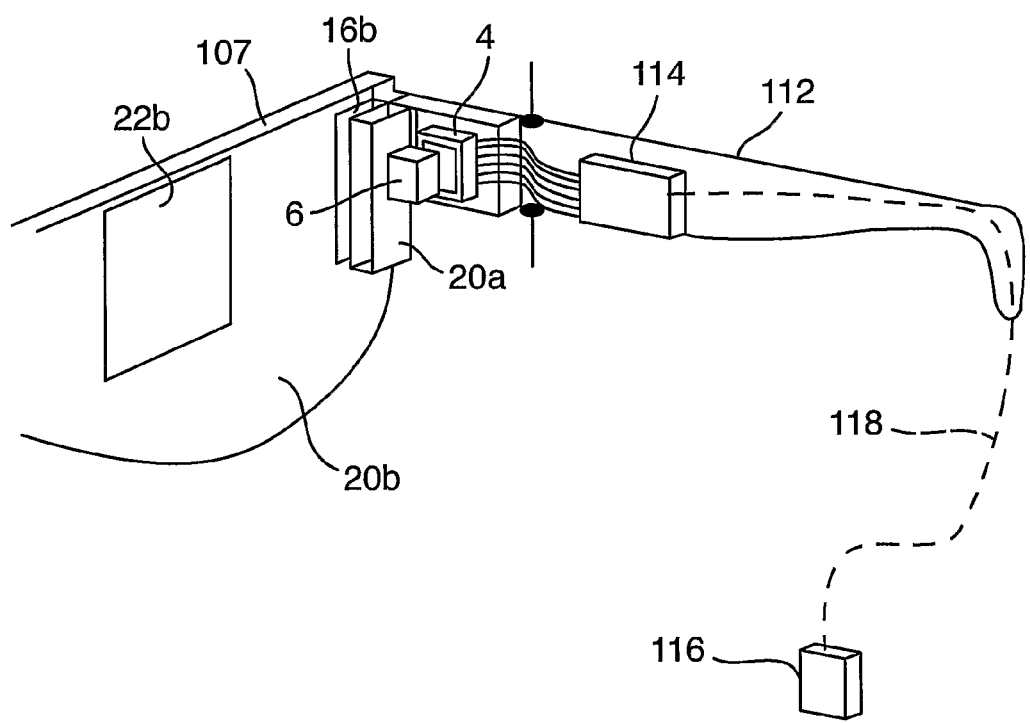
FIG. 6 illustrates an example of LOEs embedded in a standard eyeglasses frame.

For convenience of reference, this section contains a brief list of abbreviations, acronyms, and short definitions used in this document. This section should not be considered limiting. Fuller descriptions can be found below, and in the applicable Standards.

1D—one-dimensional
2D—two-dimensional
CRT—cathode ray tube
EMB—eye-motion-box
FOV—field-of-view
HMD—head-mounted display
HUD—head-up display
LCD—liquid crystal display
LOE—light-guide optical element
OLED—organic light emitting diode array
OPL—optical path length
SLM—spatial light modulator
TIR—total internal reflection DETAILED DESCRIPTION—FIGS. 8A to 15D The principles and operation of the apparatus according to a present embodiment may be better understood with reference to the drawings and the accompanying description. A present invention is an optical assembly for optical aperture expansion. The apparatus combines facet reflective technology (reflective components) with diffractive technology (diffractive components). Innovative embodiments with diffractive components use at least two components having opposite optical power (matching), so that chromatic dispersion introduced by a first diffractive component will then be cancelled by a second diffractive component. The two diffractive components are used in combination with a reflective optical component to achieve more efficient aperture expansion (for near eye display), reducing distortions and noise, while also reducing design constraints on the system and individual components, as compared to conventional techniques.

Current, conventional optical aperture expansion uses a single technology for both expansions (lateral and vertical). Current advances in the field are to optimize and improve either one of these technologies. The two main technologies that are used are:

1) Reflections by tilted coated facets (for example, U.S. Pat. No. 7,457,040 to Lumus, Ltd.). This reflective technology has wide spectrum therefore can project all visible spectrum from a single lightguide. While the facets typically both partially reflect and transmit the propagating light rays, for simplicity in this document, this technology is generally referred to as being implemented by a "reflective optical component." The reflection is typically polarization dependent.

2) Diffractive pattern on lightguide face. As is known in the art, a diffractive grating (pattern) can reflect or transmit propagating light rays, depending on the construction of the grating. For simplicity in this document, this technology is generally referred to as being implemented by a "diffractive optical component." This diffractive technology is limited in both spectrum and angle. However, this technology has low polarization dependency.

Using a sequence of reflective and diffractive components, in various quantities and order (one after the other, and vice-versa) eliminates and/or reduces the need for polarization management, while enabling wider field of view. In addition, embodiments can have reduced nonuniformity, as compared to conventional single technology implementations, since the distortion patterns of the two technologies do not correlate (are uncorrelated).

In general, an apparatus for optical aperture expansion includes at least one lightguide and a set of three optical components associated with the at least one lightguide. The set of three optical components includes a pair of matching diffractive optical components, and a reflective optical component. The reflective optical component includes a sequence of a plurality of at least partially reflective, mutually parallel surfaces. The optical components are configured to cooperate to achieve two-dimensional expansion of coupled-out light. In other words, the components cooperate for expanding coupled-in light to coupled-out light. The coupled-in light is light coupled into the at least one lightguide, and the expanding is two-dimensional.

In the context of this description, the term "matching" with regard to diffractive optical components generally refers to the grating and/or the spacing of the grating elements being substantially exactly equal so the optical powers of the diffractive components are equal, and normally opposite. While the overall physical dimensions of the components may be different, the similar gratings result in matching optical powers of the components.

In the context of this description, the term "component" is used for the optical elements, in particular the reflective and diffractive optical elements. Design and production techniques for reflective and diffractive optical components are known in the art. Based on the current description, components can be implemented as required in various shapes and sizes of reflective and diffractive optical components, with various operating parameters, including wavelength, power, and angle.

Diffractive optical components, also referred to in the context of this description as "diffractive gratings" and "diffractive patterns", can be embedded within a lightguide, or constructed or mounted on a surface (face) of a lightguide. For example, a diffractive optical component can be implemented as a diffraction grating or holographic elements. Diffractive components are available such as from Horiba Scientific (Kyoto, Japan) and reflective components are available such as OE50 by Lumus (Ness Ziona, Israel).

Referring now to FIG. 8A and FIG. 8B, there is shown respective side and front view rough sketches of a diffractive-reflective-diffractive exemplary embodiment. A combination of different optical components expands light along a different axis. Optical lightguide 10 is a two-dimensional (2D) lightguide having a direction of elongation illustrated arbitrarily herein as corresponding to the "x-axis". Lightguide 10 is referred to as a 2D waveguide in the sense that lightguide 10 guides the injected image in two dimensions by reflection between two sets of parallel faces, as shown in FIG. 8A by the four arrows inside lightguide 10. A sequence of a plurality of internal partially reflecting surfaces 40 at least partially traverse lightguide 10 at an oblique angle (i.e., neither parallel nor perpendicular) to the direction of elongation.

Incoming light 38 is coupled into lightguide 10 by a diffractive component 5. The coupled-in light enters lightguide 10 that acts as a first lateral lightguide expander in a first direction. The expanded light 38C from lightguide 10 is coupled into lightguide 2000. Optical lightguide 2000 guides light primarily along the "y-axis". The expanded light 38C continues to reflect within lightguide 2000 expanding in a second direction of expansion (y-axis) as shown by arrows in the side view of FIG. 8A. The light in lightguide 2000 is referred to in the context of this document as second expanded light 38D. As the second expanded light 38D encounters the diffractive pattern 25, the second expanded light is coupled-out 38B of the lightguide 2000 onto the observer 47. A feature of the current embodiment is that the diffractive components can be non-parallel to each other.

In general, a set of three optical components includes a first optical component (diffractive component 5) configured for directing the coupled-in light 38 in a first direction of expansion (x-axis) within a first lightguide (lightguide 10), thereby generating first expanded light 38C. A second optical component (sequence of partially reflecting surfaces 40) of the set is configured for coupling the first expanded light 38C into a second lightguide 2000 in a second direction of expansion (y-axis), thereby generating second expanded light 38D. A third optical component (diffractive component 25) of the set is configured for out-coupling the second expanded light 38D in a third direction as the coupled-out light 38B.

In the context of this description, the term "direction" generally refers to an average direction of propagation within a lightguide, typically along the optical axis (normally the length) of the lightguide. In other words, the course or general way in which light trapped in a lightguide slab by total internal reflection (TIR) advances along the lightguide slab, that is, a course of expansion in the plane of the lightguide slab, the in-plane component of the propagating light rays in the substrate of the lightguide.

The first, second and third directions are non-parallel to each other.

Figure 7A:
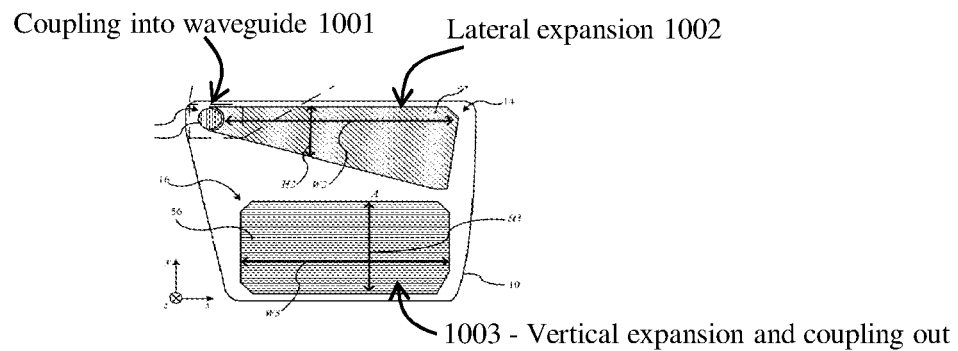
FIG. 7A is a rough sketch of conventional optical aperture expansion using diffractive components in a waveguide.
Figure 7B:
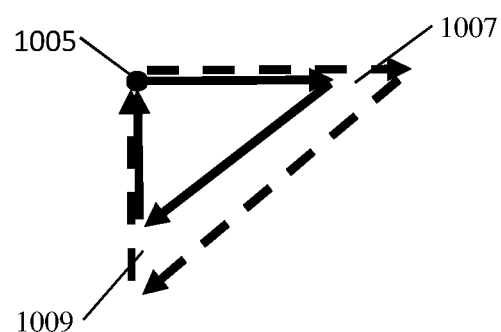
FIG. 7B is a diagram of the FIG. 7A diffraction directions of light propagating in the angular domain.

Referring now to FIG. 8D, there is shown a diagram of the FIG. 8A and FIG. 8B diffraction directions of light propagating in the angular domain (angular space). Dashed arrows and solid arrows show two different exemplary wavelengths. The direction area 1005 is the incidence angle as described in reference to FIG. 7B. Area 1007 represents the direction of the light rays (or simply "ray") after lateral expansion and reflection by the sequence of partially reflecting surfaces 40. The partially reflecting surfaces 40 divert the direction of the ray to area 1011. However, this reflection from area 1007 to area 1011 does not introduce extra dispersion, only mirroring the direction of propagation around the mirror direction (shown as dot-dash line 1008). The mirror direction 1008 is determined by the slope of the partially reflecting surfaces 40. The last diffractive element 25 diffracts the ray to area 1013. As the ray is diffracted in a compensatory fashion to diffractive component 5, then the output direction 1013 will have no dispersion but need not overlap 1005. In this embodiment, dispersion has been eliminated, but the output angle of the coupled-out light 38B does not have to match the input angle of the coupled-in light 38.

Referring now to FIG. 8C, there is shown a rough sketch of a reflective-diffract exemplary embodiment. The current figure is similar to FIG. 8A and FIG. 8B, except incoming light 38 is coupled into lightguide 10 by a slanted prism 7 (in place of diffractive component 5). As the current embodiment includes only one diffractive element (diffractive element 25), chromatic dispersion will be significant, as compared to the embodiment of FIG. 8A and FIG. 8B that includes two matching diffractive elements (5 and 25). The chromatic dispersion (aberration) can be reduced by using a narrowband light source.

Figures 9A, 9B, 9C:
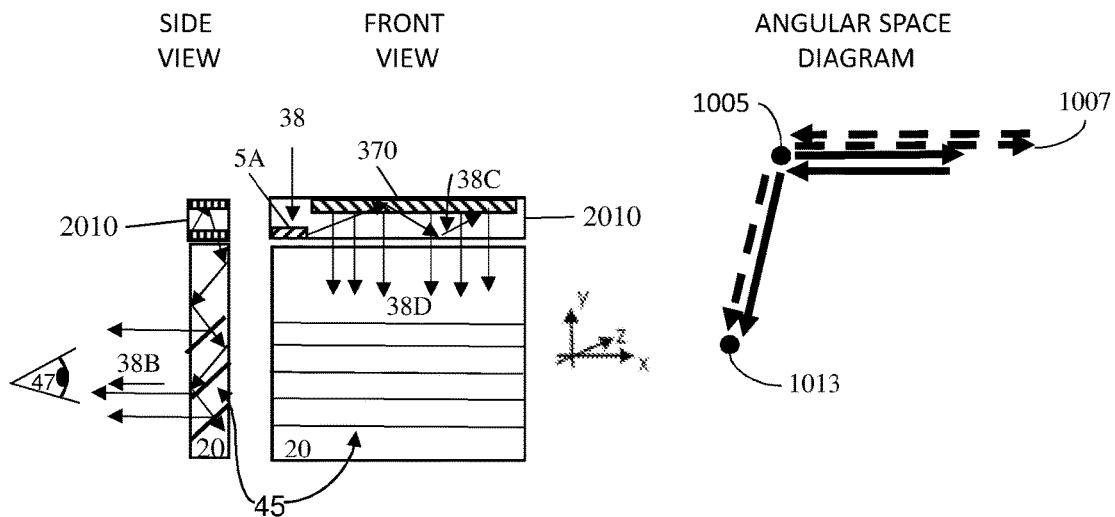
FIG. 9A and FIG. 9B are respective side and front views of a rough sketch of a diffractive-diffractive-reflective exemplary embodiment.
FIG. 9C is a diagram of the FIG. 9A and FIG. 9B diffraction directions of light propagating in the angular domain.

Referring now to FIG. 9A and FIG. 9B, there is shown respective side and front views of a rough sketch of a diffractive-diffractive-reflective exemplary embodiment. Lightguide 2010 is a 2D lightguide. In the current embodiment, a first optical component of the set is implemented by diffractive component 5A which is configured for directing the coupled-in light 38 in a first direction of expansion (x-axis) within lightguide 2010, thereby generating first expanded light 38C. A second optical component of the set is implemented by diffractive component 370 that is configured for coupling the first expanded light 38C into lightguide 20 in a second direction of expansion (y-axis), thereby generating second expanded light 38D. A third optical component of the set is implemented by a sequence of a plurality of partially reflecting surfaces (facets) 45, preferably at least partially traversing lightguide 20 at an oblique angle to the faces of lightguide 20, that is configured for out coupling the second expanded light 38D in a third direction as the coupled-out light 38B.

Referring now to FIG. 9C, there is shown a diagram of the FIG. 9A and FIG. 9B diffraction directions of light propagating in the angular domain (angular space). The angular vectors are also shown, 1005 is the entrance direction, and after the first element 5A the direction is 1007. The diffraction element 370 has the opposite optical power therefore light will couple from lightguide 2010 into lightguide 20 having the same direction and no chromatic dispersion (overlapping 1005). The facets 45 reflect the light without dispersion the preferred direction 1013 with no chromatic dispersion. Some chromatic dispersion may be introduced by the reflective component, and residual diffraction can compensate for this.

Figures 10A, 10B:
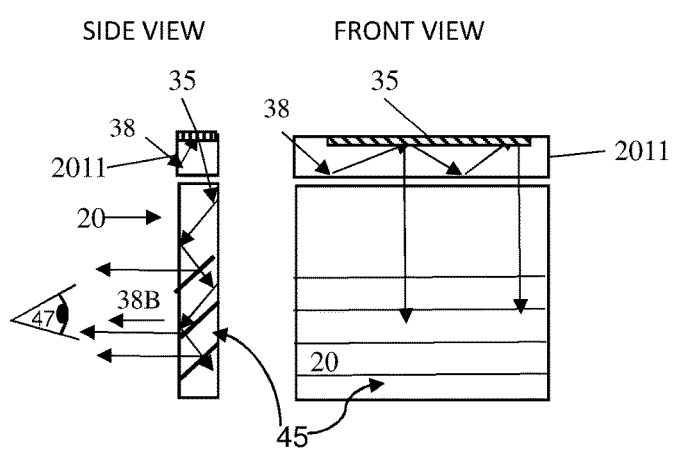
FIG. 10A and FIG. 10B are respective side and front view rough sketches of a diffractive-reflective exemplary embodiment.

Referring now to FIG. 10A and FIG. 10B, there is shown respective side and front view rough sketches of a diffractive-reflective exemplary embodiment. Lightguide 2011 is a 2D lightguide. The lateral expansion is made by the diffractive component while the vertical expansion is by the reflective facets. The method of coupling into lightguide 2011 is not depicted. The light propagates within the lightguide 2011, impinges on the diffractive surface (component) 35, and is diffracted toward lightguide 20. The diffractive component 35 can be at any surface of lightguide 2011 (in the current figure, depicted on top). As the light propagates within lightguide 20, the light is coupled-out 38B toward the eye 47 by facets 45. This configuration does not need polarization management between lightguide 2011 and lightguide 20. The injected polarization of the light can be oriented to match that required for facets 45.

Referring now to FIG. 11A and FIG. 11B, there is shown respective side and front view rough sketches of a diffractive-diffractive-reflective exemplary embodiment. A non-diffractive optical component 501 is configured to direct light into lightguide 2002 as coupled-in light, shown as light 38. In the current embodiment, a single lightguide 2002 is used, and two diffractive components have been implemented as parts of lightguide 2002. A first diffractive optical component 502 is configured for directing the coupled-in light 38 in a first direction of expansion (x-axis) within the one lightguide 2002, thereby generating first expanded light 38C. The second diffractive optical component 50 is configured for expanding the first expanded light 38C in the one lightguide 2002 in a second direction of expansion (y-axis), thereby generating second expanded light 38D. The reflective optical component (sequence of a plurality of facets 45) is configured for out-coupling the second expanded light 38D in a third direction as the coupled-out light 38B. As in the above embodiments, the first, second and third directions are non-parallel to each other.

A feature of this embodiment is the use of a single, one-dimensional lightguide. The coupling into the lightguide is by non-diffractive component 501 and the light is diverted by strong diffracting pattern 502. The light is guided in one dimension, and therefore expands in another dimension while propagating from left to right along diffractive component 50. As the light encounters diffractive pattern 50, the light is also diverted downward. While propagating downward, the light is reflected toward the observer 47 by reflective facets 45 (depicted in the side view FIG. 11A). This configuration includes a single lightguide, does not require polarization management (the polarization of the light injected into the lightguide can be suitable for the reflective facets 45). The combination of diffracting pattern 502 and diffracting pattern 50 has no resulting chromatic dispersion.

Referring now to FIG. 11C, there is shown a front view rough sketch of overlapping diffractive-reflective-diffractive exemplary embodiment. Because of the differing technology, the diffractive and reflective elements can be positioned in overlapping relation on the same lightguide. In the current figure, diffraction grating component 1110 expands coupled-in light 38 in a first direction to produce first expanded light 38C. Lateral aperture expansion is implemented by overlapping diagonal facets 1114 that couple the light back and forth laterally, expanding the light in a second direction 38D, without introducing chromatic aberration. Diffractive pattern 1112 is used for coupling the light out of the waveguide.

Referring now to FIG. 12A and FIG. 12B, there is shown respective side and front views of a rough sketch of a diffractive-reflective exemplary embodiment. Transverse expansion is based on a one-dimensional lightguide 2012 (for example, see U.S. Pat. No. 7,643,214 to Lumus Ltd.). In FIG. 12B, the coupling into the lightguide 2012 is performed by a highly reflecting (partially reflecting and reflecting a majority of the energy) internal facet 65, that reflects the majority of the coupled-in light 38 to the right and left sides of the lightguide 2012, while a portion of the coupled-in light 38 passes through the internal facet 65 into the lightguide 20. As the current embodiment includes only one diffractive element, chromatic dispersion will be significant, as compared to the below embodiment of FIG. 12C. The chromatic dispersion (aberration) can be reduced by using a narrowband light source.

Referring now to FIG. 12C, there is shown a front view of a rough sketch of a diffractive-diffractive-reflective exemplary embodiment. In this embodiment, the coupling into lightguide 2013 is performed by a diffractive component 66, having high efficiency, that reflects the majority of the coupled-in light 38 to the right and left sides of the lightguide 2013, while a portion of the coupled-in light 38 passes through the diffractive component 66 into the lightguide 20.

Similar to the description of FIG. 9B, first expanded light 38C is diffracted in FIG. 12B by diffraction components 67 and in FIG. 12C by diffractive components 68, to generate second expanded light 38D in lightguide 20.

As can be seen from the exemplary embodiments, the diffractive components can generally be located on any side of the lightguides. As in previous embodiments, by injecting the proper polarization, there is no need for further management along the apparatus.

Different wavelengths of light are deflected by diffractive patterns in different directions. This phenomenon can be used, for example by near eye displays, by implementing a separate lightguide for every wavelength. A typical embodiment is three lightguides, one each for the wavelengths corresponding to red (R), green (G), and blue (B) colored light. Separate diffractive lateral aperture expanders (one for each color) are combined to a single vertical reflective aperture expander.

Figures 13A, 13B:
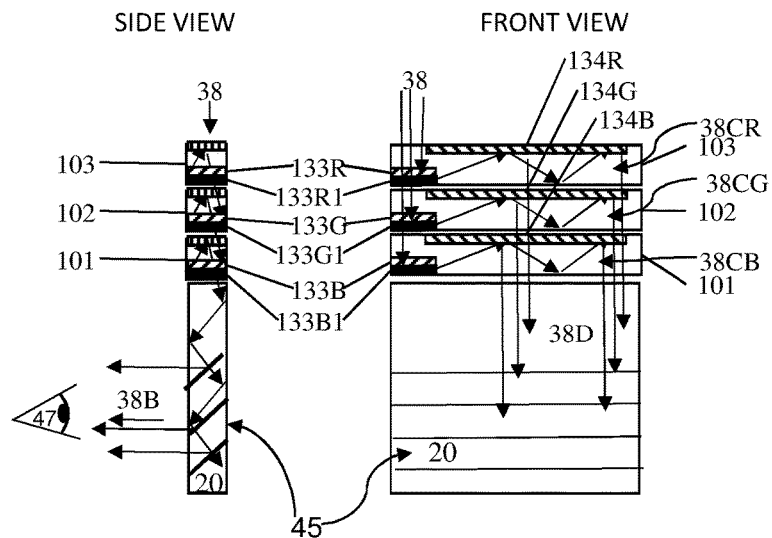
FIG. 13A and FIG. 13B are respective side and front view rough sketches of a diffractive-diffractive-reflective exemplary embodiment with separate diffractive lateral expanders.

Referring now to FIG. 13A and FIG. 13B, there is shown respective side and front view rough sketches of a diffractive-diffractive-reflective exemplary embodiment with separate diffractive lateral expanders. The current embodiment is based on the above-described embodiment with regard to FIG. 9A and FIG. 9B. FIG. 9B lightguide 2010 is replaced with a set of lightguides 103, 102, and 101. Each lightguide of the set has a first diffractive component (respectively 133R, 133G, 133B) configured for a specific wavelength, in this example red, green, and blue. Each lightguide of the set has a second diffractive component (respectively 134R, 134G, 134B) matching the first diffractive component. The coupled-in light 38 is injected through the first diffractive components. Each of these first diffractive components is wavelength specific, diffracting the specific associated wavelength of light, and passing other wavelengths of light. Wavelength specific diffraction into each lightguide may be improved by adding a set of dichroic reflectors (respectively 133R1, 133G1, 133B1) after each first diffractive component (133R, 133G, 133B). The dichroic reflectors can be based on coating or diffractive reflectors, so different wavelengths are coupled to the different respective lightguides (103, 102, and 101). The light wavelength diffracted by the first diffractive components (133R, 133G, 133B) expands and propagates laterally in the respective lightguides (103, 102, and 101) as respective first expanded light (38CR, 38CG, 38CB). Each lightguide (103, 102, 101) has a respective second diffractive component (134R, 134G, 134B) that diffracts the respective first expanded light ((38CR, 38CG, 38CB) toward lightguide 20. Light from the upper lightguides pass through the lower lightguides with minimal distortion because the second diffractive components (134G, 134B) are wavelength selective or have low diffraction efficiency for other wavelengths. In lightguide 20, the sequence of a plurality of partially reflecting surfaces 45 reflects all wavelengths toward the eye 47.

An alternative description of the current embodiment is that the pair of first 133R and second 134R matching diffractive optical components are augmented with 1) a pair of third 133G and fourth 134G matching diffractive optical components, and 2) a pair of fifth 133B and sixth 134B matching diffractive optical components. Each of the optical components of the matching pairs has a different diffractive spacing from the optical components of other matching pairs. The diffractive spacing is such that each of the optical components of the matching pairs deflects a different wavelength through similar angles from the optical components of other matching pairs. A first lightguide 103 includes the pair of first 133R and second 134R matching diffractive optical components. A second lightguide 102 includes the pair of third 133G and fourth 134G matching diffractive optical components. A third lightguide 101 includes the pair of fifth 133B and sixth 134B matching diffractive optical components.

In the current configuration, one lightguide can be in front of the eye 47, and optionally have no polarization management between the lightguides (103, 102, 101, and 20). In this configuration, the lightguides can be placed directly on top of each other (typically, an air gap is used between the lightguides in order to maintain TIR).

Figures 14A, 14B, 14C:
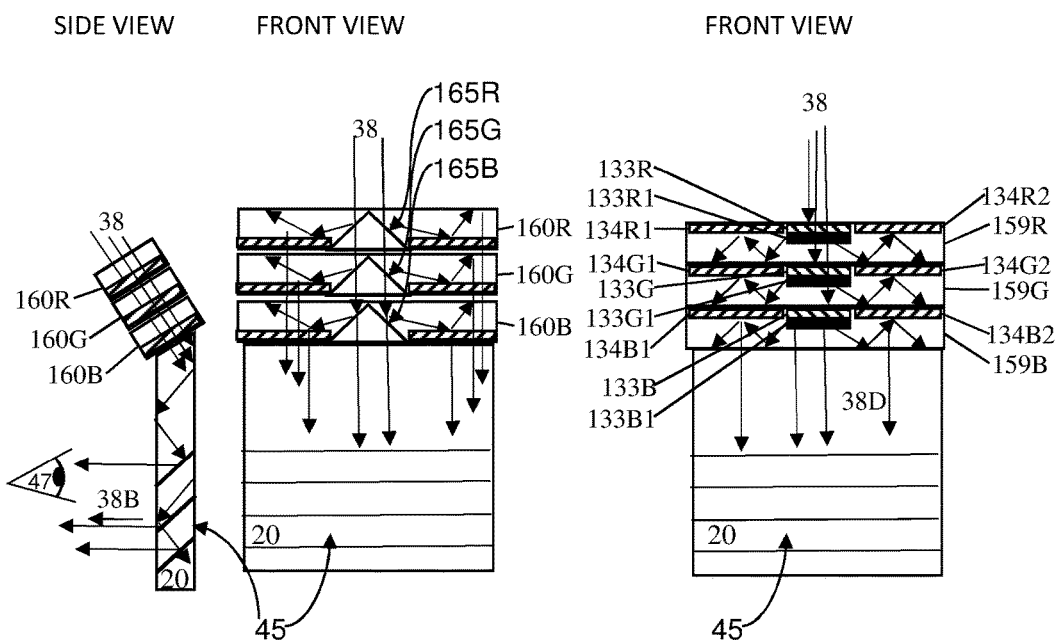
FIG. 14A and FIG. 14B are respective side and front views of a rough sketch of a diffractive-reflective exemplary embodiment.
FIG. 14C is a front view of a rough sketch of a diffractive-diffractive-reflective exemplary embodiment.

Referring now to FIG. 14A and FIG. 14B, there is shown respective side and front views of a rough sketch of a diffractive-reflective exemplary embodiment. The current embodiment is similar to the operation described in reference to FIG. 12A and FIG. 12B, with lightguide 2012 replaced/augmented (replaced with three lightguides 160R, 160G, and 160B). The coupling-in of light 38 to each lightguide (160R, 160G, 160B) is by respective highly reflecting internal facets/central splitting mirrors (165R, 165G, 165B). Lateral (transverse) expansion is diffractive in each lightguide (160R, 160G, 160B), and then the first expanded light 38C is diffracted/diverted into lightguide 20 for out-coupling to the user's eye 47.

Referring now to FIG. 14C, there is shown a front view of a rough sketch of a diffractive-diffractive-reflective exemplary embodiment. The current embodiment is similar to the operation described in reference to FIG. 12C, with diffractive component 66 replaced/augmented by a set of diffractive components (133R, 133G, 133B) and associated dichroic reflectors (respectively 133R1, 133G1, 133B1) after each first diffractive component (133R, 133G, 133B) in the center of each respective lightguide (159R, 159G, 159B). Matching diffractive elements (134R, 134G, 134B) are replaced with multiple diffractive elements (134R1, 134R2, 134G1, 134G2, 134B1, 134B2) on either side of the central diffractive components (133R, 133G, 133B).

Figures 15A, 15B, 15C:
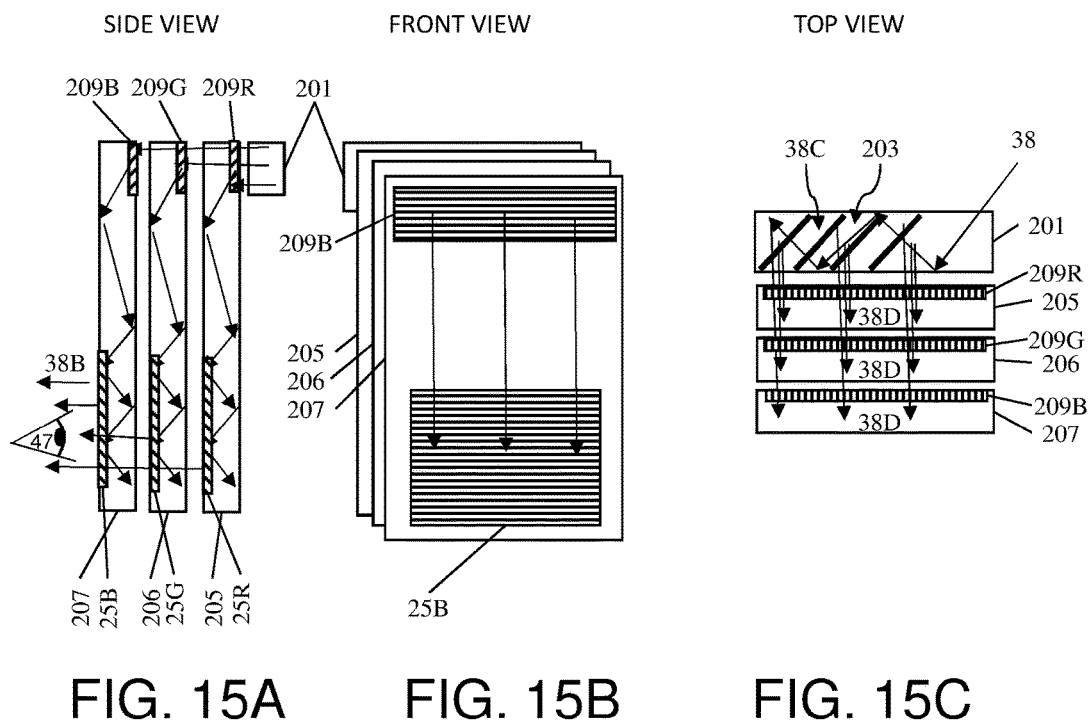
FIG. 15A, FIG. 15B, and FIG. 15C are respective side, front, and top views of a rough sketch of a reflective-diffractive-diffractive exemplary embodiment.

Referring now to FIG. 15A, FIG. 15B, and FIG. 15C, there is shown respective side, front, and top views of a rough sketch of a reflective-diffractive-diffractive exemplary embodiment. In the current embodiment, the reflective aperture expander precedes the diffractive expander. Four lightguides are used: reflective component 201, and three diffractive components (205, 206, and 207). The reflective component 201 is a reflective lateral expanding lightguide. This reflective lightguide 201 can be a 1D lightguide (similar to lightguide 20 in FIG. 4A) or a 2D light guide (similar to lightguide 10 in FIG. 8C). The light coupling into the reflective lightguide 201 includes all wavelengths of the coupled-in light 38, and therefore the reflective lightguide 201 can include a reflector (such as reflecting surface 16 in FIG. 4A, or a prism (such as slanted prism 7 in FIG. 8C).

Facets 203 (depicted in top view FIG. 15C) divert the guided light forward and out of lightguide 201 into lightguides 205, 206 and 207. Each of lightguides 205, 206 and 207 have respective coupling-in gratings (209R, 209G, 209B). These coupling-in gratings (209R, 209G, 209B) have a different period in every lightguide, therefore different wavelength will be coupled by each coupling-in grating to each associated lightguide.

The light propagates within the lightguides (205, 206, 207) and is coupled-out 38B toward the observer 47 by respective gratings (25R, 25G, 25B) designed according to wavelength within each lightguide, and matched to respective coupling-in gratings (209R, 209G, 209B).

In general, the reflective optical component (facets 203) is configured to expand the coupled-in light 38 in a first direction of expansion within a first lightguide 201, thereby generating first expanded light 38C. The first 209R, third 209G, and fourth 209B diffractive optical components are configured for coupling respective wavelengths of the first expanded light in respective first 205, second 206, and third 207 lightguides. The second 25R, fourth 25G, and sixth 25B diffractive optical components are configured for expanding and out-coupling the respective light in a third direction as the coupled-out light 38B.

Figure 15D:
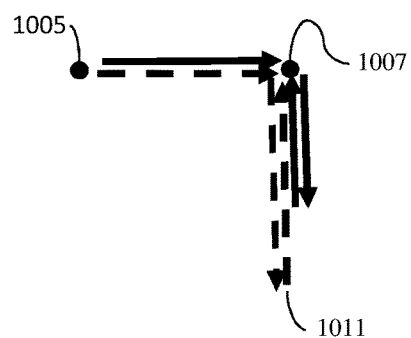
FIG. 15D is a diagram of the FIG. 15A, FIG. 15B, and FIG. 15C diffraction directions of light propagating in the angular domain.

Referring now to FIG. 15D, there is shown a diagram of the FIG. 15A, FIG. 15B, and FIG. 15C diffraction directions of light propagating in the angular domain (angular space). The angular direction front view of a single lightguide shown in FIG. 15A-C is shown in FIG. 15D. The light is coupled in as 1005 direction and the reflecting mirrors 203 divert the rays to direction 1007 without dispersion. The diffractive coupling-in component (one of 209R, 209G, 209B) divert the rays downward with dispersion while diffractive component (one of gratings 25R, 25G, 25B) has the opposite optical power, therefore coupling the light out (direction overlapping 1007) with no dispersion.

This configuration has strong anti-dispersion characteristics, and therefore can be used by a reduced number of components to transmit more than one color channel (R, G, B) and at narrow field (angular spectrum). For example, the three lightguides (205, 206, 207) can be implemented as a single lightguide, or combinations of two color channels can be implemented in a single lightguide (such as the sets of {red and green, blue} or {red, green and blue}).

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. An apparatus for optical aperture expansion comprising:
   (a) at least one lightguide, said lightguide including a first pair of external surfaces parallel to each other for guiding light by internal reflection;
   (b) a set of three optical components associated with said at least one lightguide, said set including:

(i) a pair of first and second matching diffractive optical components; and
(ii) a reflective optical component including a set of facets, said set of facets:
(A) including a plurality of partially reflecting facets parallel to each other,
(B) between said first pair of external surfaces, and
(C) non-parallel relative to said first pair of external surfaces; and
(c) said components cooperating for expanding coupled-in light to coupled-out light,
(i) said coupled-in light being light coupled into said at least one lightguide, and
(ii) said expanding being two-dimensional.

2. The apparatus of claim 1 wherein
(a) a first optical component of said set is configured for directing said coupled-in light in a first direction of expansion within a first lightguide, thereby generating first expanded light;
(b) a second optical component of said set is configured for coupling said first expanded light into a second lightguide in a second direction of expansion, thereby generating second expanded light; and
(c) a third optical component of said set configured for out-coupling said second expanded light in a third direction as said coupled-out light;
(d) wherein said first, second and third directions are non-parallel to each other.

3. The apparatus of claim 1 further including:
(a) a non-diffractive optical component configured to direct light into said at least one lightguide as said coupled-in light;
(b) wherein said at least one lightguide is one lightguide including:
(i) said first diffractive optical component configured for directing said coupled-in light in a first direction of expansion within said one lightguide, thereby generating first expanded light;
(ii) said second diffractive optical component configured for expanding said first expanded light in said one lightguide in a second direction of expansion, thereby generating second expanded light; and
(iii) said reflective optical component configured for out-coupling said second expanded light in a third direction as said coupled-out light;
(iv) wherein said first, second and third directions are non-parallel to each other.

4. The apparatus of claim 1 further including:
(i) a pair of third and fourth matching diffractive optical components; and
(ii) a pair of fifth and sixth matching diffractive optical components.

5. The apparatus of claim 4 wherein each of said optical components of said matching pairs has a different diffractive spacing from said optical components of other matching pairs, said diffractive spacing such that each of said optical components of said matching pairs deflects a different wavelength through similar angles from said optical components of other matching pairs.

6. The apparatus of claim 5 wherein said wavelengths are of red, green, and blue light.

7. The apparatus of claim 5 wherein:
(a) a first lightguide of said at least one lightguide includes said pair of first and second matching diffractive optical components;
(b) a second lightguide of said at least one lightguide includes said pair of third and fourth matching diffractive optical components; and
(c) a third lightguide of said at least one lightguide includes said pair of fifth and sixth matching diffractive optical components.

8. The apparatus of claim 7 wherein:
(a) said reflective optical component is configured to expand said coupled-in light in a first direction of expansion within a first lightguide, thereby generating first expanded light;
(b) said first, third, and fourth diffractive optical components are configured for expanding respective wavelengths of said first expanded light in respective first, second, and third lightguides in a second direction of expansion, thereby generating respective second expanded light; and
(c) said second, fourth, and sixth diffractive optical components are configured for out-coupling said respective second expanded light in a third direction as said coupled-out light;
(d) wherein said first, second and third directions are non-parallel to each other.

* * * * *